No. 819,071. PATENTED MAY 1, 1906.
F. A. LA ROCHE & M. C. RYPINSKI.
ELECTRICAL MEASURING INSTRUMENT.
APPLICATION FILED NOV. 8, 1904.
2 SHEETS—SHEET 1.
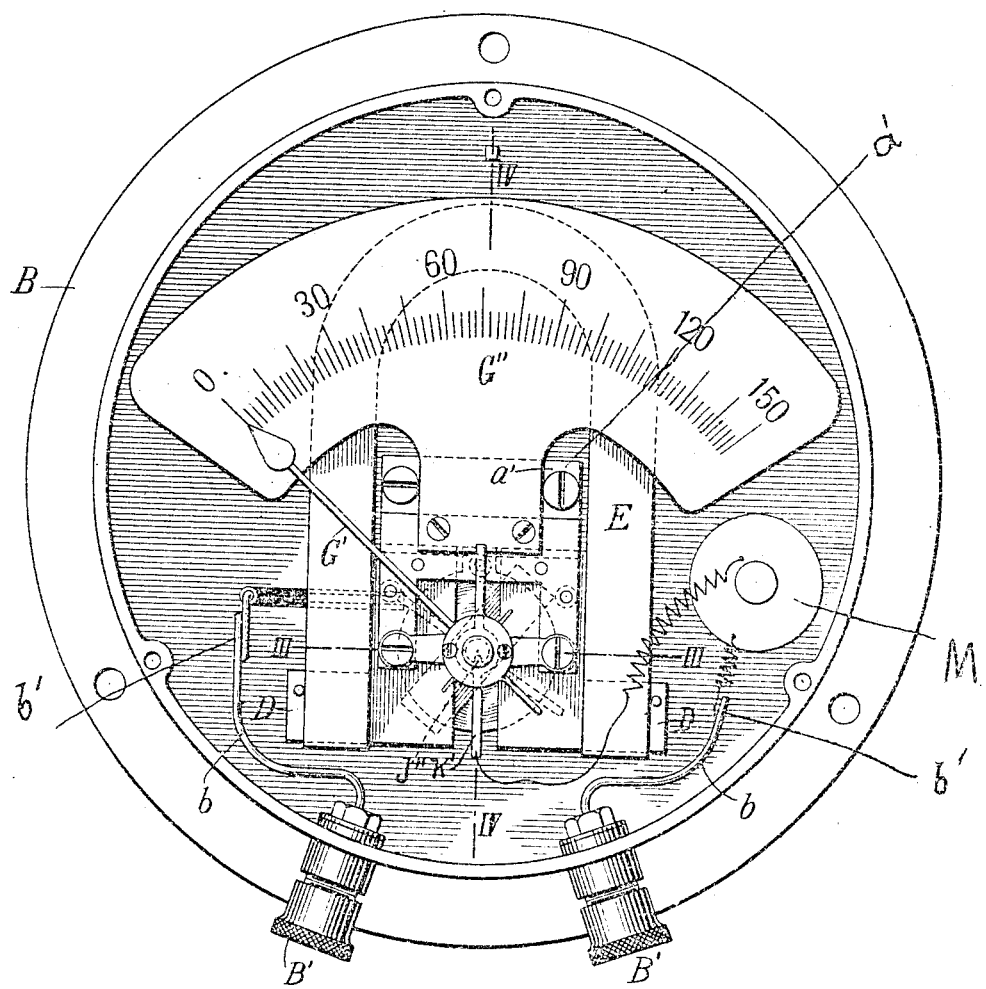
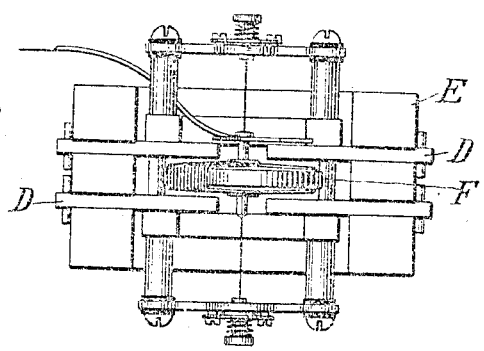

UNITED STATES PATENT OFFICE.

FREDRICK A. LA ROCHE AND MAURICE C. RYPINSKI, OF NEW YORK, N. Y.

ELECTRICAL MEASURING INSTRUMENT.

No. 819,071.  Specification of Letters Patent.  Patented May 1, 1906.

Application filed November 8, 1904. Serial No. 231,926.

*To all whom it may concern:*

Be it known that we, FREDRICK A. LA ROCHE and MAURICE C. RYPINSKI, citizens of the United States, and residents of New York city, New York, (post-office address No. 654 Hudson street, New York city, New York,) have invented a new and useful Improvement in Electrical Measuring Instruments, which is fully set forth in the following specification.

This invention relates to electrical measuring instruments containing a movable pointer whose angular movement is directly proportional to the amount of current passing through the instrument.

The invention consists of the construction and arrangement of the parts, as hereinafter pointed out and claimed. It will be best understood by reference to the accompanying drawings, that illustrate one embodiment of our invention.

Figure 3:
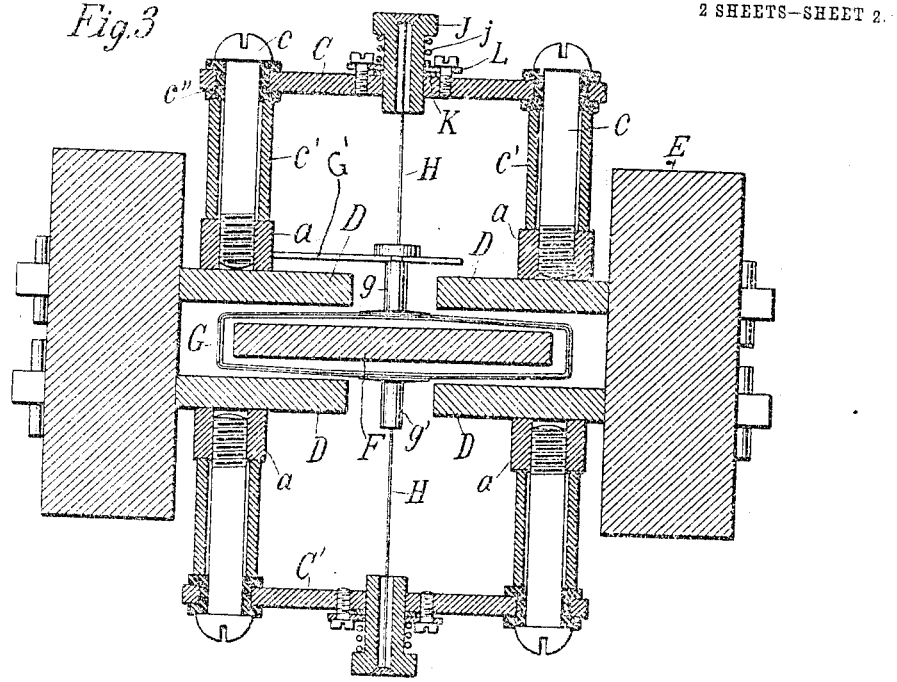
Figure 4:
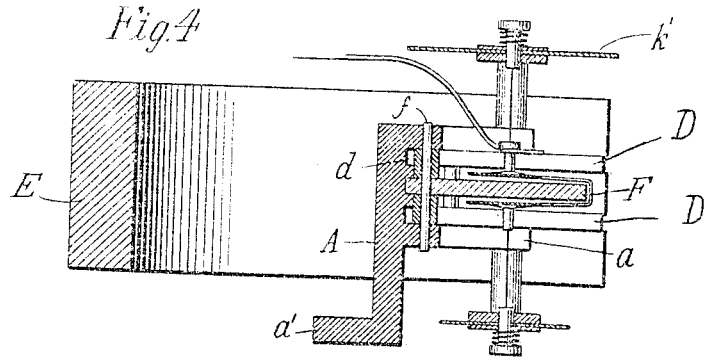
Figure 5:
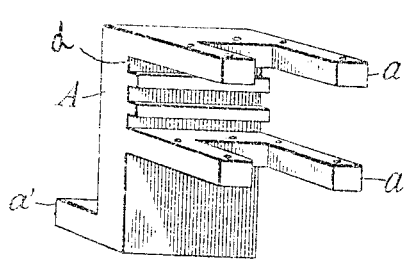
Figure 6:
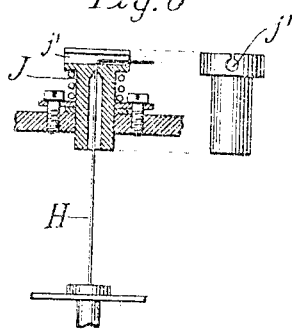

In the drawings, Figure 1 shows the face of our instrument in a suitable case adapted to be fastened on the wall or upon a switchboard, but the view will be referred to as a plan view. Fig. 2 is an end view of the same instrument removed from its case. Fig. 3 is a sectional view of the same through the lines III III of Fig. 1. Fig. 4 is a sectional view through the lines IV IV of Fig. 1. Fig. 5 is a perspective of the center piece, and Fig. 6 is a detail of a modification.

A is a center piece, preferably of brass, substantially in the shape of the letter F in cross-section and provided with two pairs of forwardly-extending horizontal arms $a$, as seen in Fig. 5, and also provided with a rearwardly-extending foot $a'$, adapted to be secured to the back or the bottom of the instrument-case B.

C represents a (brass) bridge-piece, held out a fixed distance from the upper arms $a$ of the center piece by screws $c$, sleeves $c'$, and insulation $c''$. A similar bridge-piece C' is supported in like manner below the two lower arms $a$.

D represents four flat rectangular plates of (soft) iron, each secured in any convenient manner to the inner face of one of the four arms $a$. Preferably the rear portion of center piece A will be grooved out to form seats $d$ for these plates D to hold them more rigidly in position.

E represents a permanent U-shaped magnet whose forward ends are slotted out to receive the four plates D, which latter are firmly secured in these slots, and thus constitute pole-pieces for the magnet.

F is a disk of (soft) iron, supported concentrically of the system midway between the upper and lower plates D. Preferably the rear of disk F is inserted into a suitable seat in the back of center piece A and is held there by a pin $f$, as seen in Fig. 4. Similar pins may serve to secure the plates D to the center piece A. It will thus be seen that the magnet is supported by its pole-pieces D, which latter are supported by the center pieces A, and that the bridge-pieces C and C' are supported by screws and sleeves, which latter are supported by the center piece—in other words, that the whole system is supported upon the center piece A.

G represents the moving coil, shown as rectangular in form and consisting of a number of turns of fine wire properly wound upon a copper damping-frame and adapted to travel in the four air-gaps between the opposing faces of the four pole-pieces D and the core F, all as seen in Fig. 3. The moving coil G is provided with two oppositely-disposed hubs $g\ g'$, to each of which is secured a filament H, that in turn is connected to the bridge-piece C in a manner to be described, while upon the upper hub is made fast the pointer G', that sweeps over the scale-plate G''.

In the center of each bridge-piece is a hollow plug J, through which the filament H (preferably a flattened filament) is passed, being made fast at the top. A coil-spring $j$ bears against the shoulder of each plug J to tauten the filament H and hold the moving coil G in proper position; but in practice only one spring may be used. For the purpose of adjustment and calibration the plug J is provided with a longitudinal groove $j''$, (see Fig. 1,) which engages the tongue of an annular plate K, that is held in place by another plate L, which in turn is secured to the bridge-piece by screws. To adjust the position of the moving coil with its pointer G', first loosen the screws of plate L, then partially rotate plate K by means of its arms $k'$, and then tighten the screws of plate L. At M is shown the usual high resistance in series with the moving coil G to adapt the instrument for use as a voltmeter. This resistance M may be cut out of circuit and the instrument used with a resistance in parallel circuit as an ammeter.

In Fig. 6 is shown a modification in which the passage through the plug J is contracted about midway its length to form a bearing for the filament H, and across the top of the plug is an inverted keyhole-slot j'. The end of filament H is passed through the plug J and then forced down into slot j' and soldered in place. To tauten the filament, remove the soldering, loosen the end of the filament, stretch the filament the desired amount, and then restore to place and solder it as before.

Current is led into the instrument through one of the two binding-posts B', thence through connections b to one of the arms k', to the plug J and filament H, and to the hub g and windings G, and the current passes out through a similar course to the outer post B'. At b' the connections from the instrument are soldered to connections from the binding-posts, so that by removing the solder the instrument can be taken from its case after the screws have been taken out of the foot a'. The fields of force between the pole-pieces D and the core F are permanent, constant, and uniformly intense. The effect of the passage of a given current through the windings G is therefore uniform and constant, and the angular movement of the moving coil with its pointer G' is exactly proportional to the flow of current through the instrument, and the markings on the scale-plate are equidistant. It will be noted that the filaments H serve a threefold purpose—they act as positive supports for the moving coil, (which is not pivoted,) they lead current into and out of the moving coil, and their torsion serves to restore the coil, with its pointer, to the initial position. The compactness and simplicity of our instrument are notable. The F-shaped center piece A may be made by the three operations of milling, drilling, and tapping. The same is true of the permanent magnet, which has only to be bent, milled, hardened, magnetized, and aged, thus eliminating such expensive operations as drilling, tapping, and grinding. All the other parts are simple and inexpensive in construction and easily put together.

We do not limit ourselves to the precise constructions and arrangements shown and described, since the same are given in some detail merely for the sake of clearness. Parts of our construction may be employed to the exclusion of other parts without departing from the spirit of the invention.

Having thus described our invention, we claim—

1. In an electrical measuring instrument, the combination of an F-shaped center piece having four horizontally-projecting arms, a flat iron pole-piece supported by each of said arms, a flat iron core supported by said center piece between said four pole-pieces, a permanent U-shaped magnet supported by said pole-pieces, an insulated bridge-piece supported above said center piece, a similar bridge-piece below the same, filaments extending between said bridge-pieces and supporting a moving coil, and said moving coil located in the flat fields of force between said fields and said plates.

2. In an electrical measuring instrument, the combination of a center piece providing supports for four pole-pieces and for a centrally-disposed core between the same, said pole-pieces and core, and a permanent U-shaped magnet supported by said pole-pieces, two bridge-pieces supported from said center piece, and a moving coil suspended between said pole-pieces.

3. The herein-described F-shaped center piece for electrical measuring instruments, having two pairs of forwardly-extended arms.

4. In an electrical measuring instrument, the combination with suitable parts for forming the field of force and a coil movable in said field and two filaments for suspending said coil, of means for supporting each filament, the same consisting of a hollow plug to which the end of the filament is secured, said plug being axially adjustable in a fixed support.

5. In an electrical measuring instrument, the combination of a permanent magnet having four flat pole-pieces, a soft-iron core supported centrally of the latter to provide four flat uniform and intense fields of force, and a moving coil of substantially rectangular shape surrounding said core and suspended within said fields of force by two filaments having electrical connection therewith and with the binding-posts of the instrument.

6. In an electrical measuring instrument, the combination of a magnet having four flat pole-pieces and a centrally-disposed core outlining fields of magnetic force, a moving coil located within said fields of force, oppositely-disposed filaments for suspending said moving coil, and means for supporting and adjusting said filaments.

7. In an electrical measuring instrument, the combination of a permanent magnet having four flat pole-pieces, a core centrally disposed between said pole-pieces and serving with them to outline four flat fields of force, a moving coil surrounding said core and located within said fields of force, two oppositely-disposed filaments carrying said coil, supports for said filaments and a yielding device interposed between said supports.

8. In an electrical measuring instrument, the combination of a permanent magnet having four flat pole-pieces, a core centrally disposed between said pole-pieces and serving with them to outline four flat fields of force, a moving coil surrounding said core and located within said fields of force, two oppositely-disposed filaments carrying said coil, and supports for said filaments, one or both of said supports being adjustable.

9. In an electrical measuring instrument, the combination of a permanent magnet having four flat pole-pieces, a core centrally disposed between said pole-pieces and serving with them to outline four flat fields of force, a moving coil surrounding said core and located within said fields of force, two oppositely-disposed filaments carrying said coil, supports for said filaments, and a yielding device interposed between said supports, one or both of said supports being adjustable.

10. In an electrical measuring instrument, the combination of a permanent magnet and a core therefor outlining an intense field of force, a movable coil located in said field of force, means for supporting said coil consisting of two oppositely-disposed filaments, a support for each filament, each of said supports being provided with means for adjusting its filament axially without affecting it longitudinally.

11. In an electrical measuring instrument, the combination of a permanent magnet and a core therefor outlining an intense field of force, a movable coil located in said field of force, means for supporting said coil consisting of two oppositely-disposed filaments, a support for each filament, each of said supports being provided with means for adjusting its filament longitudinally without moving it axially.

12. In an electrical measuring instrument, the combination of a permanent magnet and a core therefor outlining an intense field of force, a movable coil located in said field of force, means for supporting said coil consisting of two oppositely-disposed filaments, a support for each filament, each of said supports being provided with means for adjusting its filament axially without affecting it longitudinally and also with means for adjusting the filament longitudinally without moving it axially.

In testimony whereof we have signed this specification in the presence of two subscribing witnesses.

FREDRICK A. LA ROCHE.
MAURICE C. RYPINSKI.

Witnesses:
A. M. BOTTCHER,
G. M. MACWILLIAM.